(12) United States Patent
Stanley

(10) Patent No.: US 9,750,199 B2
(45) Date of Patent: Sep. 5, 2017

(54) AIR COOLED HORTICULTURE LIGHTING FIXTURE

(71) Applicant: IP Holdings, LLC, Vancouver, WA (US)

(72) Inventor: John Stanley, Vancouver, WA (US)

(73) Assignee: IP Holdings, LLC, Vancouver, WA (US)

( * ) Notice: Subject to any disclaimer, the term of this patent is extended or adjusted under 35 U.S.C. 154(b) by 94 days.

(21) Appl. No.: 14/665,381

(22) Filed: Mar. 23, 2015

(65) Prior Publication Data

US 2015/0252993 A1 Sep. 10, 2015

Related U.S. Application Data

(63) Continuation-in-part of application No. 13/945,794, filed on Jul. 18, 2013, now Pat. No. 9,016,907, and a continuation-in-part of application No. 29/493,634, filed on Jun. 11, 2014, now Pat. No. Des. 748,849.

(51) Int. Cl.
| | |
|---|---|
| *B60Q 1/06* | (2006.01) |
| *A01G 7/04* | (2006.01) |
| *H01J 61/22* | (2006.01) |
| *F21V 29/60* | (2015.01) |

(52) U.S. Cl.
CPC .............. *A01G 7/045* (2013.01); *F21V 29/60* (2015.01); *H01J 61/22* (2013.01); *Y02P 60/146* (2015.11)

(58) Field of Classification Search
CPC .................................. F21V 29/60; A01G 7/045
See application file for complete search history.

(56) References Cited

U.S. PATENT DOCUMENTS

| | | | |
|---|---|---|---|
| 32,722 | A | 7/1861 | Schmidlin |
| D46,253 | S | 8/1914 | Kopp |
| 1,410,945 | A | 3/1922 | Walker Mayfield |
| 1,547,026 | A | 7/1925 | Canney |
| 1,798,567 | A | 3/1931 | Wagenhorst |
| D85,049 | S | 9/1931 | Kopp |
| D85,382 | S | 10/1931 | Guth |

(Continued)

FOREIGN PATENT DOCUMENTS

| | | |
|---|---|---|
| CA | 2034710 A1 | 8/1991 |
| CA | 1314529 C | 3/1993 |

(Continued)

OTHER PUBLICATIONS

Apollo Horticulture GLRCTAC 6" Air Cool Tube Grow Light Deluxe Glass Cylinder with Hood Reflector, image post date Oct. 15, 2010, site visted Oct. 3, 2014, (online), <http://www.amazon.com/apollo-horticulture-glrctac-cylinder-reflector/dp/b003qkvv04/ref=pd_sbs_lg_5?ie=utf8&refrid=1y9v9qhh4n5vnctjmftr>.

(Continued)

*Primary Examiner* — Evan Dzierzynski
(74) *Attorney, Agent, or Firm* — J. Douglas Wells

(57) ABSTRACT

An air cooled horticulture lamp fixture for growing plants in confined indoor spaces. The fixture substantially seals the lamp and heat generated thereby to a reflector interior. A flow disruptor diverts moving air away from an aperture in the reflector through which a lamp bulb socket protrudes into the reflector interior, and the flow disruptor creates turbulence in a cooling chamber thereby enhancing thermal transfer into a cooling air stream that flows over and around the reflector's exterior side thereby convectively cooling the fixture using the reflector as a heat sink.

13 Claims, 11 Drawing Sheets

(56) References Cited

U.S. PATENT DOCUMENTS

| | | |
|---|---|---|
| 1,848,734 A | 3/1932 | Luce |
| 1,873,310 A | 8/1932 | Doane |
| 1,930,070 A | 10/1933 | Zecher |
| 1,987,705 A | 1/1935 | Pedersen |
| D106,614 S | 10/1937 | Waterbury |
| 2,194,841 A | 3/1940 | Welch |
| D119,800 S | 4/1940 | Carter |
| D123,768 S | 12/1940 | Scribner |
| D125,559 S | 3/1941 | Biller |
| 2,242,590 A | 5/1941 | Marcel |
| D128,049 S | 7/1941 | Kurtz |
| D135,375 S | 3/1943 | Biller |
| 2,339,100 A | 1/1944 | Netting |
| 2,348,617 A | 5/1944 | Furedy |
| D156,014 S | 11/1949 | Lazerson |
| 2,492,946 A | 1/1950 | Barber |
| D174,221 S | 3/1955 | Hatch |
| 2,740,883 A | 4/1956 | Kruger |
| 2,741,694 A | 4/1956 | Wiig |
| 2,998,511 A | 8/1961 | Kingsley Chan |
| 3,025,391 A | 3/1962 | Golko |
| D193,802 S | 10/1962 | Thomsen |
| D195,012 S | 4/1963 | Hoyle |
| 3,125,301 A | 3/1964 | Stotter |
| 3,263,071 A | 7/1966 | Fabbri |
| 3,272,978 A | 9/1966 | Jackson |
| 3,322,946 A | 5/1967 | Cooper |
| 3,420,995 A | 1/1969 | Dunckel |
| D213,391 S | 2/1969 | Bruno |
| 3,433,941 A | 3/1969 | Hall |
| 3,675,008 A | 7/1972 | Hill |
| 3,684,883 A | 8/1972 | Entwistle |
| 3,701,898 A | 10/1972 | McNamara, Jr. |
| 3,755,667 A | 8/1973 | Price |
| 3,829,677 A | 8/1974 | DeLlano |
| 3,902,059 A | 8/1975 | McNamara, Jr. |
| 3,911,265 A | 10/1975 | Landrum |
| 4,028,542 A | 6/1977 | McReynolds, Jr. |
| D245,016 S | 7/1977 | Barr |
| 4,037,096 A | 7/1977 | Brengord |
| 4,078,169 A | 3/1978 | Armstrong |
| 4,175,360 A | 11/1979 | Mulvey |
| 4,229,782 A | 10/1980 | Ruud |
| D259,738 S | 6/1981 | Boschetti |
| 4,308,573 A | 12/1981 | McNamara, Jr. |
| D262,659 S | 1/1982 | Laltta |
| D266,578 S | 10/1982 | Moshier |
| D268,287 S | 3/1983 | Boschetti |
| D270,577 S | 9/1983 | DeVos |
| 4,446,506 A | 5/1984 | Larson |
| 4,531,180 A | 7/1985 | Hernandez |
| 4,616,293 A | 10/1986 | Baliozian |
| 4,669,033 A | 5/1987 | Lee |
| D290,662 S | 7/1987 | Basil |
| D300,877 S | 4/1989 | Cyr |
| 4,855,884 A | 8/1989 | Richardson |
| 4,893,221 A | 1/1990 | Friedman |
| 4,933,821 A | 6/1990 | Anderson |
| 4,939,629 A | 7/1990 | Glanton |
| D311,597 S | 10/1990 | Poot |
| 4,970,428 A | 11/1990 | Hayakawa |
| 4,980,809 A | 12/1990 | Baldwin |
| D316,301 S | 4/1991 | Michael |
| 5,006,752 A | 4/1991 | Eggink |
| 5,065,294 A | 11/1991 | Poot |
| 5,072,349 A | 12/1991 | Waniga |
| D323,897 S | 2/1992 | Compton |
| 5,088,015 A | 2/1992 | Baggio |
| D329,104 S | 9/1992 | Dieperink |
| D330,438 S | 10/1992 | Herst |
| 5,192,129 A | 3/1993 | Figueroa |
| 5,199,784 A | 4/1993 | Hempleman |
| 5,253,152 A | 10/1993 | Yang |
| D349,358 S | 8/1994 | Herst |
| 5,353,746 A | 10/1994 | Del Rosario |
| D352,126 S | 11/1994 | Ruud |
| 5,440,470 A | 8/1995 | Ly |
| 5,457,450 A | 10/1995 | Deese |
| 5,461,554 A | 10/1995 | Leonetti |
| D365,159 S | 12/1995 | Tinen |
| 5,486,737 A | 1/1996 | Hrubowchak |
| 5,510,676 A | 4/1996 | Cottaar |
| D373,000 S | 8/1996 | Brady |
| 5,555,162 A | 9/1996 | Shemitz |
| D374,301 S | 10/1996 | Kleffman |
| 5,568,680 A | 10/1996 | Parker |
| 5,570,947 A | 11/1996 | Felland |
| D376,437 S | 12/1996 | Karlo |
| D377,993 S | 2/1997 | Herst |
| 5,621,267 A | 4/1997 | Shaffner |
| D383,243 S | 9/1997 | Fry |
| 5,698,947 A | 12/1997 | Choi |
| 5,702,179 A | 12/1997 | Sidwell |
| D391,632 S | 3/1998 | Thomas |
| D396,319 S | 7/1998 | Sutton |
| D397,481 S | 8/1998 | Schafer |
| D399,328 S | 10/1998 | Compton |
| D399,329 S | 10/1998 | Compton |
| D399,587 S | 10/1998 | Compton |
| D400,289 S | 10/1998 | Wardenburg |
| 5,816,694 A | 10/1998 | Ideker |
| D401,006 S | 11/1998 | Edwards |
| D405,976 S | 2/1999 | Beall |
| 5,896,004 A | 4/1999 | Feldman |
| 5,924,789 A | 7/1999 | Thornton |
| 5,932,955 A | 8/1999 | Berger |
| 5,938,317 A | 8/1999 | Thornton |
| D415,304 S | 10/1999 | Brown |
| 5,983,564 A | 11/1999 | Stragnola |
| 5,987,697 A | 11/1999 | Song |
| 5,999,943 A | 12/1999 | Nori |
| D418,626 S | 1/2000 | Herst |
| D419,248 S | 1/2000 | Lyons |
| 6,024,468 A | 2/2000 | Kassay |
| 6,042,250 A | 3/2000 | Stragnola |
| 6,051,927 A | 4/2000 | Graser |
| 6,053,624 A | 4/2000 | Cronk |
| D425,237 S | 5/2000 | Scott |
| D425,652 S | 5/2000 | Brok |
| D426,010 S | 5/2000 | Compton |
| 6,061,690 A | 5/2000 | Nori |
| 6,065,849 A | 5/2000 | Chen |
| 6,070,173 A | 5/2000 | Huber |
| 6,076,944 A | 6/2000 | Maranon |
| 6,079,851 A | 6/2000 | Altman |
| D428,516 S | 7/2000 | Reo |
| 6,094,919 A | 8/2000 | Bhatia |
| 6,111,739 A | 8/2000 | Wu |
| 6,152,579 A | 11/2000 | Reed |
| D439,008 S | 3/2001 | Kim |
| 6,210,025 B1 | 4/2001 | Schmidt |
| 6,230,497 B1 | 5/2001 | Morris |
| D443,198 S | 6/2001 | Snyder |
| D443,949 S | 6/2001 | DiMonte |
| 6,247,830 B1 | 6/2001 | Winnett |
| D445,943 S | 7/2001 | Littman |
| 6,257,735 B1 | 7/2001 | Baar |
| 6,267,483 B1 | 7/2001 | Hembery |
| D447,272 S | 8/2001 | Smith |
| 6,279,012 B1 | 8/2001 | Sexton |
| 6,299,327 B1 | 10/2001 | Camarota |
| D452,559 S | 12/2001 | Schonberger |
| 6,343,984 B1 | 2/2002 | Langdon |
| 6,371,630 B1 | 4/2002 | Unger |
| D456,927 S | 5/2002 | Russello |
| D456,928 S | 5/2002 | Russello |
| D456,938 S | 5/2002 | Wardenburg |
| D459,825 S | 7/2002 | Field |
| 6,488,387 B2 | 12/2002 | Wardenburg |
| D469,564 S | 1/2003 | Brok |
| 6,527,422 B1 | 3/2003 | Hutchison |
| 6,548,948 B1 | 4/2003 | Muessli |
| 6,595,662 B2 | 7/2003 | Wardenburg |
| 6,601,972 B2 | 8/2003 | Sei |

(56) References Cited

U.S. PATENT DOCUMENTS

| | | |
|---|---|---|
| 6,658,652 B1 | 12/2003 | Alexander |
| 6,679,619 B2 | 1/2004 | Saieva |
| D486,593 S | 2/2004 | Griffin |
| 6,688,759 B1 | 2/2004 | Hadjimichael |
| 6,709,131 B1 | 3/2004 | Herst |
| 6,729,383 B1 | 5/2004 | Cannell |
| 6,783,263 B1 | 8/2004 | Cronk |
| D496,121 S | 9/2004 | Santoro |
| D499,504 S | 12/2004 | Meyer |
| D499,505 S | 12/2004 | Benensohn |
| D504,343 S | 4/2005 | Ek |
| 6,885,134 B2 | 4/2005 | Kurashima |
| 6,908,212 B2 | 6/2005 | Schultz |
| 7,011,424 B1 | 3/2006 | Poulson |
| 7,083,309 B2 | 8/2006 | Chan |
| 7,101,060 B2 | 9/2006 | Oppenheimer |
| 7,131,753 B1 | 11/2006 | Edwards, Jr. |
| 7,156,539 B2 | 1/2007 | Cronk |
| 7,175,309 B2 | 2/2007 | Craw |
| D542,460 S | 5/2007 | Hargreaves |
| D543,652 S | 5/2007 | Hargreaves |
| D543,654 S | 5/2007 | Hargreaves |
| D543,655 S | 5/2007 | Hargreaves |
| 7,213,948 B2 | 5/2007 | Hein |
| D544,136 S | 6/2007 | Hargreaves |
| D544,138 S | 6/2007 | Hargreaves |
| D544,139 S | 6/2007 | Hargreaves |
| D544,626 S | 6/2007 | Hargreaves |
| D544,980 S | 6/2007 | Hargreaves |
| D544,981 S | 6/2007 | Hargreaves |
| D544,983 S | 6/2007 | Hargreaves |
| D544,984 S | 6/2007 | Hargreaves |
| D544,985 S | 6/2007 | Hargreaves |
| D544,987 S | 6/2007 | Hargreaves |
| D544,994 S | 6/2007 | Hargreaves |
| D544,995 S | 6/2007 | Hargreaves |
| D545,460 S | 6/2007 | Mason, II |
| D545,484 S | 6/2007 | Hargreaves |
| D545,485 S | 6/2007 | Hargreaves |
| D544,982 S | 7/2007 | Hargreaves |
| D545,990 S | 7/2007 | Hargreaves |
| D545,994 S | 7/2007 | Hargreaves |
| D545,996 S | 7/2007 | Hargreaves |
| D549,869 S | 8/2007 | Ward |
| 7,296,914 B1 | 11/2007 | Russello |
| 7,360,927 B2 | 4/2008 | Oka |
| D569,024 S | 5/2008 | Redfern |
| D572,858 S | 7/2008 | Santoro |
| 7,445,363 B2 | 11/2008 | Vanden Eynden |
| 7,524,090 B2 | 4/2009 | Hargreaves |
| 7,534,011 B2 | 5/2009 | Townsley |
| D595,894 S | 7/2009 | Verfuerth |
| D602,625 S | 10/2009 | Santoro |
| D603,087 S | 10/2009 | Mo |
| 7,617,057 B2 | 11/2009 | May |
| D605,342 S | 12/2009 | Chung |
| D608,490 S | 1/2010 | Chung |
| 7,641,367 B2 | 1/2010 | Hargreaves |
| 7,654,702 B1 | 2/2010 | Ding |
| D613,900 S | 4/2010 | Hargreaves |
| D614,801 S | 4/2010 | Collins |
| 7,722,228 B2 | 5/2010 | Broer |
| D617,028 S | 6/2010 | Verfuerth |
| D620,190 S | 7/2010 | Chung |
| D621,993 S | 8/2010 | Jong |
| 7,771,086 B2 | 8/2010 | Goverde |
| D628,335 S | 11/2010 | Hyland |
| 7,854,534 B2 | 12/2010 | Liu |
| D632,419 S | 2/2011 | Ng |
| D633,247 S | 2/2011 | Kong |
| D633,640 S | 3/2011 | Wauters |
| D634,060 S | 3/2011 | Wardenburg |
| D634,240 S | 3/2011 | Junkeer |
| D634,468 S | 3/2011 | Hargreaves |
| D634,469 S | 3/2011 | Hargreaves |
| D637,162 S | 5/2011 | Bridgman |
| D637,341 S | 5/2011 | Wardenburg |
| D637,752 S | 5/2011 | Mekhtarian |
| D640,404 S | 6/2011 | Chipperfield |
| 7,959,331 B2 | 6/2011 | Ho |
| D641,100 S | 7/2011 | Li |
| 7,972,044 B2 | 7/2011 | Burkhauser |
| D644,185 S | 8/2011 | Hargreaves |
| 7,987,632 B2 | 8/2011 | May |
| 8,018,630 B2 | 9/2011 | Herloski |
| 8,038,318 B2 | 10/2011 | Plunk |
| D648,652 S | 11/2011 | Hawkins |
| D649,685 S | 11/2011 | Trzesniowski |
| D650,515 S | 12/2011 | Bradley |
| D650,935 S | 12/2011 | Beghelli |
| 8,113,696 B2 | 2/2012 | Striebel |
| D655,403 S | 3/2012 | Zakula |
| D657,748 S | 4/2012 | Hargreaves |
| D660,252 S | 5/2012 | Hargreaves |
| D661,833 S | 6/2012 | Imajo |
| 8,209,912 B2 | 7/2012 | Hargreaves |
| 8,215,799 B2 | 7/2012 | Vanden Eynden |
| D667,584 S | 9/2012 | Beghelli |
| D668,370 S | 10/2012 | Guercio |
| D671,259 S | 11/2012 | Chen |
| D672,908 S | 12/2012 | Wilcox |
| D672,911 S | 12/2012 | Mayfield, III |
| D673,324 S | 12/2012 | Mayfield |
| 8,334,640 B2 | 12/2012 | Reed |
| D675,369 S | 1/2013 | Michaud |
| 8,348,481 B2 | 1/2013 | Chang |
| D675,772 S | 2/2013 | Tran |
| 8,371,726 B2 | 2/2013 | Collins |
| D678,597 S | 3/2013 | Lehman |
| D678,599 S | 3/2013 | Boyer |
| D679,848 S | 4/2013 | Pickard |
| D683,064 S | 5/2013 | Tuck |
| 8,505,224 B2 | 8/2013 | Huang |
| D689,238 S | 9/2013 | Halsey |
| D690,875 S | 10/2013 | McKenzie |
| D693,959 S | 11/2013 | Boyer |
| D697,663 S | 1/2014 | Speier |
| D698,074 S | 1/2014 | Hargreaves |
| D698,075 S | 1/2014 | Klus |
| D698,986 S | 2/2014 | Reynolds |
| D698,987 S | 2/2014 | Stanley |
| D699,386 S | 2/2014 | Park |
| D702,827 S | 4/2014 | Mase |
| 8,702,283 B2 | 4/2014 | Bradley, Jr. |
| D705,474 S | 5/2014 | Philips |
| D705,974 S | 5/2014 | Blessitt |
| 8,723,086 B2 | 5/2014 | McMahan |
| D707,385 S | 6/2014 | Wardenburg |
| D708,390 S | 7/2014 | Roos |
| D710,528 S | 8/2014 | Wardenburg |
| 8,801,235 B2 | 8/2014 | Yurich |
| D713,953 S | 9/2014 | Jepson |
| D714,988 S | 10/2014 | Park |
| D715,994 S | 10/2014 | Klus |
| D716,995 S | 11/2014 | Zhu |
| D717,487 S | 11/2014 | Guzzini |
| D717,636 S | 11/2014 | Stanley |
| D720,488 S | 12/2014 | Toyohisa |
| D720,505 S | 12/2014 | Kersten |
| 8,905,575 B2 | 12/2014 | Durkee |
| D720,876 S | 1/2015 | Haverfield |
| D721,844 S | 1/2015 | Lay |
| D722,654 S | 2/2015 | Martone |
| D725,819 S | 3/2015 | Reynolds |
| D725,820 S | 3/2015 | Hargreaves |
| 8,967,821 B2 | 3/2015 | Pickard |
| D726,359 S | 4/2015 | Grigore |
| 8,998,473 B1 | 4/2015 | Anderson |
| 9,016,892 B1 | 4/2015 | Scribante |
| 9,016,907 B2 | 4/2015 | Stanley |
| D728,848 S | 5/2015 | Reyes |
| D729,435 S | 5/2015 | Arndt |
| D730,556 S | 5/2015 | Toyohisa |
| D731,103 S | 6/2015 | Wilke |

(56) References Cited

U.S. PATENT DOCUMENTS

| | | |
|---|---|---|
| D731,109 S | 6/2015 | Wardenburg |
| D731,701 S | 6/2015 | Hargreaves |
| D732,233 S | 6/2015 | Reynolds |
| D732,234 S | 6/2015 | Rashidi Doust |
| D732,235 S | 6/2015 | Reynolds |
| D732,236 S | 6/2015 | Reynolds |
| D733,347 S | 6/2015 | Dungan |
| D733,952 S | 7/2015 | Lay |
| D733,960 S | 7/2015 | Howe |
| D734,534 S | 7/2015 | Howe |
| D735,391 S | 7/2015 | Blessitt |
| D735,401 S | 7/2015 | Clements |
| D736,450 S | 8/2015 | Reynolds |
| D737,498 S | 8/2015 | Stanley |
| 9,110,209 B2 | 8/2015 | Blessitt |
| D738,031 S | 9/2015 | Martins |
| D739,595 S | 9/2015 | Reynolds |
| 9,127,826 B2 | 9/2015 | Boyer |
| D740,486 S | 10/2015 | Stanley |
| D740,996 S | 10/2015 | Tragatschnig |
| D745,993 S | 12/2015 | Reynolds |
| D747,029 S | 1/2016 | Reynolds |
| D747,538 S | 1/2016 | Hargreaves |
| D747,825 S | 1/2016 | Reynolds |
| D747,923 S | 1/2016 | Cornu |
| D748,319 S | 1/2016 | Johnson |
| D748,320 S | 1/2016 | Johnson |
| D748,847 S | 2/2016 | Johnson |
| D748,849 S | 2/2016 | Stanley |
| D748,850 S | 2/2016 | Johnson |
| D749,773 S | 2/2016 | Waible |
| D750,312 S | 2/2016 | Reynolds |
| D750,313 S | 2/2016 | Reynolds |
| D750,316 S | 2/2016 | Reynolds |
| 9,255,690 B2 | 2/2016 | Dimitriadis |
| D750,831 S | 3/2016 | Clements |
| D751,244 S | 3/2016 | Reynolds |
| D751,245 S | 3/2016 | Stanley |
| D751,247 S | 3/2016 | Reynolds |
| D753,654 S | 4/2016 | Eastwood |
| 9,310,037 B2 | 4/2016 | Cercone |
| D756,016 S | 5/2016 | Hargreaves |
| D756,023 S | 5/2016 | Hoffer |
| D756,026 S | 5/2016 | Reynolds |
| D757,323 S | 5/2016 | Reynolds |
| D757,326 S | 5/2016 | Reynolds |
| D757,346 S | 5/2016 | Stanley |
| 9,335,038 B2 | 5/2016 | Stanley |
| 9,366,947 B2 | 6/2016 | Miyata |
| D762,320 S | 7/2016 | Reynolds |
| D765,306 S | 8/2016 | Wardenburg |
| D766,756 S | 9/2016 | Franc |
| D769,513 S | 10/2016 | Reynolds |
| D769,514 S | 10/2016 | Reynolds |
| D770,079 S | 10/2016 | Stanley |
| D770,082 S | 10/2016 | Reynolds |
| D770,670 S | 11/2016 | Reynolds |
| D770,671 S | 11/2016 | Reynolds |
| D771,301 S | 11/2016 | Stanley |
| D771,304 S | 11/2016 | Goltche |
| D773,107 S | 11/2016 | Stanley |
| D775,406 S | 12/2016 | Hargreaves |
| D775,760 S | 1/2017 | Reynolds |
| D780,985 S | 3/2017 | Stanley |
| D780,986 S | 3/2017 | Reynolds |
| D781,492 S | 3/2017 | Reynolds |
| D783,887 S | 4/2017 | Stanley |
| D786,488 S | 5/2017 | Reynolds |
| D786,489 S | 5/2017 | Stanley |
| D786,490 S | 5/2017 | Stanley |
| 2002/0073285 A1 | 6/2002 | Butterworth |
| 2002/0141195 A1 | 10/2002 | Peter |
| 2003/0031011 A1 | 2/2003 | Miller |
| 2003/0191783 A1 | 10/2003 | Wolczko |
| 2004/0240214 A1 | 12/2004 | Whitlow |
| 2005/0117333 A1 | 6/2005 | Yoshida |
| 2005/0160481 A1 | 7/2005 | Todd |
| 2005/0233691 A1 | 10/2005 | Horton |
| 2006/0231081 A1 | 10/2006 | Kirakosyan |
| 2006/0232984 A1 | 10/2006 | Schuknecht |
| 2006/0282457 A1 | 12/2006 | Williams |
| 2007/0051321 A1 | 3/2007 | Chang |
| 2007/0070633 A1 | 3/2007 | Eynden |
| 2007/0228993 A1 | 10/2007 | Stuer |
| 2007/0246631 A1 | 10/2007 | Brown |
| 2007/0282806 A1 | 12/2007 | Hoffman |
| 2008/0059799 A1 | 3/2008 | Scarlata |
| 2008/0117617 A1 | 5/2008 | Hargreaves |
| 2008/0130304 A1 | 6/2008 | Rash |
| 2008/0205030 A1 | 8/2008 | Hargreaves |
| 2008/0205071 A1 | 8/2008 | Townsley |
| 2008/0212326 A1 | 9/2008 | Chon |
| 2008/0278950 A1 | 11/2008 | Pickard |
| 2008/0278957 A1 | 11/2008 | Pickard |
| 2009/0116250 A1 | 5/2009 | Hargreaves |
| 2009/0231840 A1 | 9/2009 | Boehme |
| 2009/0262540 A1 | 10/2009 | Hargreaves |
| 2009/0276478 A1 | 11/2009 | Soman |
| 2009/0310373 A1 | 12/2009 | Burkhauser |
| 2009/0316404 A1 | 12/2009 | Mo |
| 2009/0323335 A1 | 12/2009 | Yang |
| 2010/0214789 A1 | 8/2010 | Hawkes |
| 2010/0238661 A1 | 9/2010 | Pfund |
| 2010/0277908 A1 | 11/2010 | Hu |
| 2010/0277929 A1 | 11/2010 | Hargreaves |
| 2010/0295468 A1 | 11/2010 | Pedersen |
| 2010/0302768 A1 | 12/2010 | Collins |
| 2011/0169412 A1 | 7/2011 | Yurich |
| 2011/0203096 A1 | 8/2011 | Hargreaves |
| 2011/0259665 A1 | 10/2011 | Morgan |
| 2012/0051041 A1 | 3/2012 | Edmond |
| 2012/0092859 A1 | 4/2012 | Gregoris |
| 2012/0145699 A1 | 6/2012 | McMahan |
| 2012/0212883 A1 | 8/2012 | Hargreaves |
| 2012/0230035 A1 | 9/2012 | Bradley, Jr. |
| 2013/0077329 A1 | 3/2013 | Hessling |
| 2013/0083539 A1 | 4/2013 | Dimitriadis |
| 2013/0155685 A1 | 6/2013 | Stanley |
| 2013/0242573 A1 | 9/2013 | Petrsoki |
| 2013/0250567 A1 | 9/2013 | Edmond |
| 2014/0378283 A1 | 12/2014 | Qiu |
| 2015/0023022 A1 | 1/2015 | Stanley |
| 2015/0098215 A1 | 4/2015 | Torabifard |
| 2015/0252992 A1 | 9/2015 | Stanley |
| 2015/0252993 A1 | 9/2015 | Stanley |
| 2015/0252994 A1 | 9/2015 | Stanley |
| 2015/0260381 A1 | 9/2015 | Verfuerth |

FOREIGN PATENT DOCUMENTS

| | | |
|---|---|---|
| EP | 0325003 A1 | 7/1989 |
| EP | 0440274 A1 | 8/1991 |
| WO | 02063210 A2 | 8/2002 |
| WO | 03060379 | 7/2003 |
| WO | 2008018000 A1 | 2/2008 |
| WO | 2009096775 A2 | 8/2009 |
| WO | 2011119451 A1 | 9/2011 |
| WO | 2015009333 | 1/2015 |

OTHER PUBLICATIONS

Apollo Horticulture GLRLS24 6" Air Cooled Hydroponic Grow Light Glass Reflector Hood, image post date Oct. 15, 2010, site visted Oct. 3, 2014, (online), <http://www.amazon.com/apollo-horticulture-GLRLS24-hydroponic-reflector/dp/B00BMVK8HG/ref=cm_cd_ql_qh_dp_i>.

Adjustable Reflector, image post date Apr. 23, 2012, site visited Sep. 23, 2015, http://web.archive.org/web/2012043260757/http://hydroponics-products.en.alibaba.com/product/519225678-213056444/adjustable_reflector_grow_light_hydropnics_greenhouse_horticulture_reflector_hood.html.

(56) References Cited

OTHER PUBLICATIONS

Agrotech Magnum Reflector, image post date Feb. 5, 2012, site visited Oct. 31, 2014, www.hydroponics.net//136580.
Cree CR22, image post date Apr. 28, 2011, site visited Nov. 15, 2014, http://ledsmagazine.com/content/dam/leds/migrated/objects/news/8/4/19/cree204272011.jpg.
ZR series High Efficacy Troffer, image post date Apr. 13, 2012, site visited Oct. 31, 2014, www.cree.com/lighting/products.
Grow Lights Home Depot: Find many types of grow lights for your plant, published Dec. 22, 2012, online. Site visited Jun. 25, 2014. Http:///besthomedecorfurniture.com/gardening-décor/grow-lights-home-depot-few-things-to-consider-when-buying-grow-lighting-plants-online.html.
LED Grow Light Comparison Test Review, Youtube.com, published Jun. 29, 2012, online. Site visited Jun. 25, 2014. www.youtube.com/watch?v=f-8oy0qbgrs.
Illuminator Pro-Series Hybrid 350W, wordpress.com, published Dec. 22, 2010, online, site visited Jun. 25, 2014. http://growsetup.wordpress.com/category/grow-lights/.
California Lightworks NEW SolarStorm 440W LED Grow Light with UVB, hydrobuilder.com, online. Site visited Jun. 25, 2014. http://hydrobuilder.com/solarstorm-440w-led-grow-light-with-uvb.html?dzid=strands_CLW-SS-440.
2013 Sunlight Supply Cataog, Issuuu.com, published Aug. 1, 2013, online. Site visited Feb. 2, 2015. http://issuu.com/sunlightsupply/docs/2013_sunlightproductcatalog/49.
Pages 29 and 54 from 2014-2015 dealer catalog showing and describing Super Sun DE reflector published by Sunlight Supply, Inc. 2014.
Dominator XXXL Non AC Reflector pack of 3 Spec Sheet, GreenTreesHydroponics.com, date available Mar. 12, 2014, online. Site visited Feb. 3, 2015, https://www.hydroponics.net/i/141477.
Low Rider Air-Cooled Reflector—TinEye, image post date Oct. 11, 2012, site visited Oct. 1, 2015, www.tineye.com/search/1b0e187c5ed9e4e9cfb55d0472271385a2c0e88/?pluginver.
OG Air Cooled Parabolic Reflector Only—Make the Most of Your Grow Light, GroWell Hydroponics, http://www.growell.co.uk/og-air-cooled-parabolic-reflector-only.html, pp. 1-2, accessed Aug. 26, 2014.
Air Resistance: Distinguishing Between Laminar and Turbulent Flow, www.docstoc.com, Dec. 29, 2010, p. 1-6.
Sun Systems LEC 630 Light Emitting Ceramic Fixture, Spec Sheet for 906217—Sun System LEC 630 120 Volt w/3100 K Lamps, www.sunlightsupply.com/shop/bycategory/led-lighting/sun-system-lec-630-light-emitting-ceramic-fixture, online, updated Feb. 9, 2015. Site visited Mar. 30, 2015, p. 1.
Mohri, Mineko, International Preliminary Report on Patentability for PCT/US2014/014959, Jan. 19, 2016.
A3V Reflector, Titaness Light Shop, www.titanesslightshop.com/products-page/reflectors/a3v-reflector, online. Site visited Jan. 14, 2015.
G2V Grow Light Reflector, Titaness Light Shop, www.titanesslightshop.com/products-page/reflectors/g2v-grow-light-reflector, online. Site visited Jan. 14, 2015.
1000 Watt Galaxy Grow Amp Double Ended Grow Light Packages, image post date Jan. 30, 2014, sited visited Jul. 8, 2016, <http://www.ehydroponics.com/100-watt-galaxy-grow-amp-double-ended-grow-light-package.html>.
2009-10-watt-light-set—TinEye, image post date May 23, 2012, site visited Jul. 8, 2016, <https://www.tineye.com/search/2de39cf51f7a031139a80ce555e2f30d0abd5216/>.
Square 10 Watt LED Grow Light, image post date Aug. 1, 2011, site visited Jul. 8, 2016, <http://www.dhgate.com/store/product/hydroponic-vegetable-10-watt-led-grow-light/216755031.html>.
Sun System 630 Ceramic Metal Halide 120v Specifications, GrowersHouse.com, update on Sep. 9, 2014, Online. Site visited Feb. 3, 2015. <http://growershouse.com/aitdownloadablefiles/download/aitfie/aifile_id/583/>.
Growlite HDE 600W-1000W Double Ended Lamp Concealed Vacuum Airflow Technology, Indoor Grow Science, site visited Aug. 3, 2016, <http://www.indoorgrowscience.net/downloads/specs/hde.pdf>.
Air Resistance: Distinguishing Between Laminar and Turbulent Flow, www.docstoc.com, Dec. 29, 2010, pp. 1-6.
Sun Systems LEC 315—Reviews?, rollitup.com forum, published Oct. 23, 2013, online. Visited Nov. 8, 2016. <http://rollitup.org/t/sun-systems-lec-315-reviews.742794>.
Sun System LEC 315 120v Light Emitting Ceramic Metal Halide Fixture w/ Free Ratchet Light Hangers, Amazon.com, earliest review of Jul. 2, 2014, online. Visited Nov. 8, 2016, <https://www.amazon.com/sun-system-emitting-ceramic-fixture/dp/B00HBCV8TM>.
LEC 315 Watt Grow Light Great Yield Reports!, YouTube.com, published Mar. 31, 2014, online. Visited Nov. 8, 2016, <https://www.youtube.com/watch?v=QqcoW19KnUk>.
Air Cooled Grow Lights, greenstreamhydroponics.com, published May 24, 2014, online. Site visited Nov. 16, 2006. <http://web.archive.org/web/20140524103407/http://www.greenstreamdydroponics.com/aircooled-reflector-range-from-greenstream-hydroponics/prod_699.html>.

AIR COOLED HORTICULTURE LIGHTING FIXTURE

RELATED APPLICATIONS

This application is a continuation-in-part of U.S. patent application Ser. No. 13/945,794 filed on Jul. 18, 2013, and this application is a continuation-in-part of U.S. Design patent application Ser. No. 29/493,634 filed on Jun. 11, 2014.

TECHNICAL FIELD OF THE INVENTION

This invention relates generally to horticulture light fixtures for growing plants indoors, and particularly to an air cooled fixture used in confined indoor growing spaces that burns a high intensity horticulture lamp.

DESCRIPTION OF RELATED AND PRIOR ART

Horticulture light fixtures used for growing plants in confined indoor spaces must provide adequate light to grow plants, while not excessively raising the temperature of the growing environment. Removal of the heat generated by the fixture is commonly achieved by forcing cooling air around the lamp and through the fixture, exhausting the same out of the growing environment. The air used for cooling the fixture is not mixed with the growing atmosphere, as the growing atmosphere is specially controlled and often enhanced with Carbon Dioxide to aid in plant development and health.

Innovations in electronic ballast technology made feasible for use in the indoor garden industry an improved high pressure sodium 'HPS' grow lamp that is connected to power at each end of the lamp, thus the term "Double Ended". The double ended lamp as powered from each end is also supported by sockets at each end, thereby eliminating the need for a frame support wire inside the lamp as required in standard single ended HPS lamps. The absence of frame wire eliminates shadows that commonly plague single ended HPS lamps. The double ended lamp further benefits from a smaller arc tube that is gas filled rather than vacuum encapsulated. The smaller arc tube equates to a smaller point source of light, thereby improving light projection control and photometric performance. The double ended HPS lamp proves to be more efficient than its single ended HPS lamp equivalent, last longer than like wattage HPS lamps, and produces more light in beneficial wavelength for growing plants than any single ended HPS lamps of the same light output rating.

The double ended HPS lamp, with all of its light output performance advantages, has a significant particularity in operation, specifically when cooling the lamp. Operating temperatures at the lamp envelope surface must be maintained within a narrow operating range else the double ended HPS lamp's efficiencies in electrical power conversion into light energy are significantly reduced. When impacted by moving air, the double ended HPS lamp draws excessive electrical current which may cause failure or shutdown of the ballast powering the lamp. When bounded by stagnant air held at constant operating temperature the double ended HPS lamp proves more efficient in converting electricity to light energy and produces more light in the plant usable spectrum. This particularity in the double ended HPS lamp makes it an excellent grow lamp, but also thwarted earlier attempts to enclose, seal, and air cool the double ended HPS lamp to be used in confined indoor growing application due to the lamp's substantial sensitivity to moving cooling air.

Another challenges not resolved by the prior art involves sealing the glass sheet to the bottom of the fixture. The reflector interior temperatures when burning a double ended HPS lamp cause failures of gasket materials. Further, the ultraviolet and infrared light energies produced by the double ended HPS lamp degrade and make brittle rubber, neoprene, and most other gasket materials suitable for sealing the glass sheet.

Gavita, a lighting company from Holland produces various fixtures utilizing the double ended HPS lamp. The usual configuration includes a reflector with a spine, the spine having a socket on each opposing end such that the double ended lamp is suspended under a reflector over the plants. The reflector is not sealed from the growing environment, nor is there a housing enclosure or ducts to facilitate forced air cooling. The Gavita fixtures provide the benefit of the high performing double ended HPS lamp, but lacks air cooling capability which is necessary in many indoor growing applications as discussed above.

What is needed, are horticulture lighting fixtures and methods for using such fixtures that address particular aspects of the high intensity horticulture lamps use in such fixtures.

SUMMARY OF THE INVENTION

In view of the foregoing, one object of the present invention is to provide an air cooled double ended HPS lamp fixture for growing plants in confined indoor environments.

A further object of this invention is to provide a fixture construct wherein the excessive heat generated by the lamp is removed using a stream of forced air.

It is another object of the present invention to provide a stagnant air space around the lamp that is maintained at constant temperatures within the reflector during operation to prevent the lamp from drawing excessive current when subjected to temperatures differentials, or direct moving cooling air.

Another object of the present invention is to provide a positive air tight seal between the fixture and the growing environment using a gasket that is protected from the lamp's damaging light.

This invention further features turbulence enhancement of the cooling air stream by a diverter that disrupts the air stream creating eddies over the top of the reflector.

An object of the present invention is to provide a horticulture lighting fixture that allows for improved operation of single ended high pressure sodium horticulture lamps.

An object of the present invention is to provide a horticulture lighting fixture that allows for improved operation of a high intensity horticulture lamp tube oriented horizontally and substantially parallel to the fixture opening.

An object of the present invention is to provide alternative structures for an air cooled horticulture lighting fixture that utilizes a cooling chamber to remove heat conducted through reflective material isolating the lamp from the cooling chamber.

Other objects, advantages, and features of this invention will become apparent from the following detailed description of the invention when contemplated with the accompanying drawings.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry such as electrical power connection are not necessarily depicted in order to provide a clear view of the various embodiments of the invention, thus the drawings are generalized in form in the interest of clarity and conciseness.

FIG. 3A is a perspective exploded view of the flow disruptor in FIG. 1.

FIG. 3B is a perspective exploded view of the flow disruptor in FIG. 3A further including turbulators.

DETAILED DESCRIPTION OF THE DRAWINGS

Figure 1:
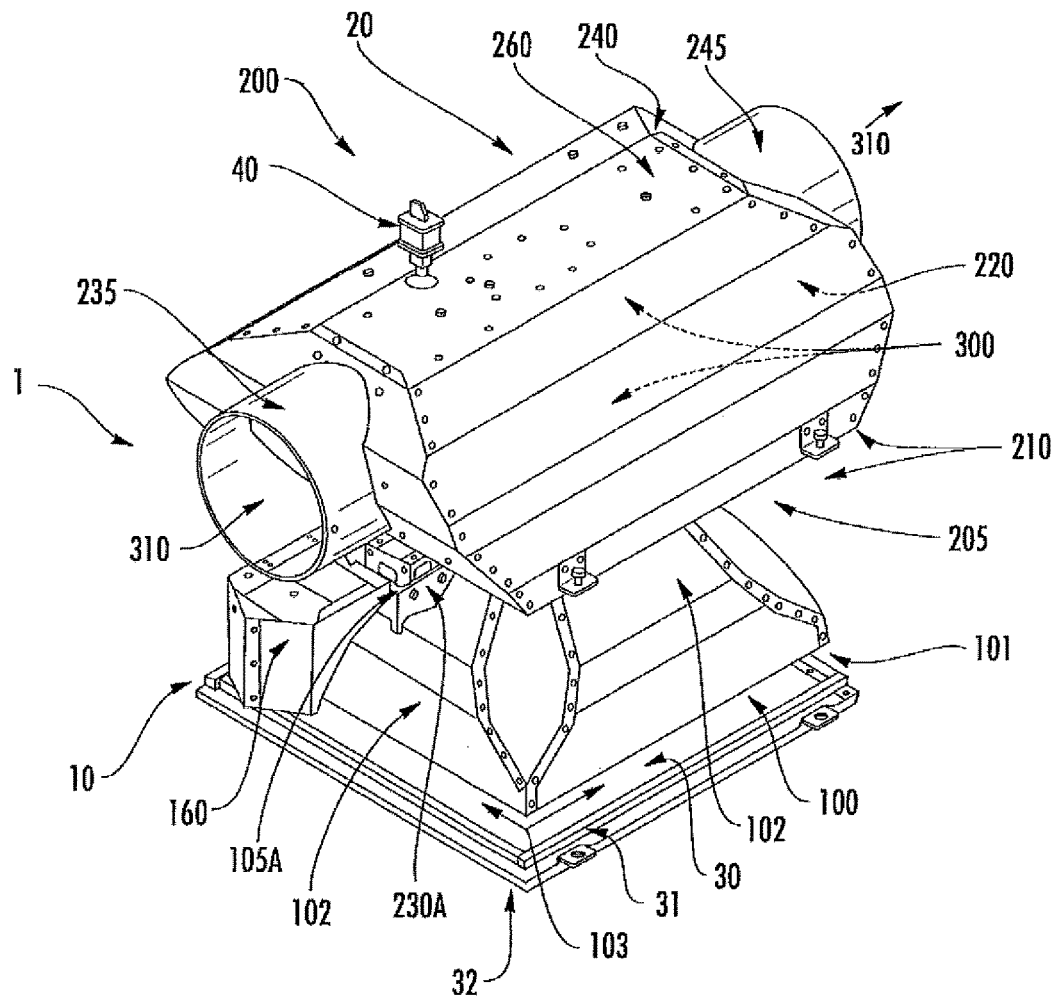
FIG. 1 shows an isometric exploded view of a preferred embodiment of the inventive fixture.

As depicted and shown in the FIGS., a "heat sink" is a component used for absorbing, transferring, or dissipating heat from a system. Here, the reflector 100 acts as the "heat sink" for the lamp 2 which is isolated from the cooling air stream 310 within the reflector interior side 101. The reflector 100 convectively transfers heat generated by the lamp 2 into the cooling air stream 310. "Convectively transfers" refers to the transport of heat by a moving fluid which is in contact with a heated component. Here, the fluid is air, specifically the cooling air stream 310 and the heated component is the reflector 100. Due to the special prerequisite criteria that the double ended high pressure sodium (HPS) lamp 2 be isolated from moving air, and specifically the cooling air stream 310, the heat transfer is performed convectively from the reflector exterior side 102 to the cooling air stream 310. The rate at which the heat transfer can convectively occur depends on the capacity of the replenishable fluid (i.e. cooling air stream 310) to absorb the heat energy via intimate contact with the relatively high temperature at the reflector exterior surface 102. This relationship is expressed by the equation $q=hA\Delta T$, wherein, "h" is the fluid convection coefficient that is derived from the fluid's variables including composition, temperature, velocity and turbulence. "Turbulence" referring to a chaotic flow regime wherein the fluid/air undergoes irregular changes in magnitude and direction, swirling and flowing in eddies. "Laminar" flow referring to a smooth streamlined flow or regular parallel patterns, generally having a boundary layer of air against the surface over which the laminar flow moves. When cooling with a heat sink device within a cooling medium such as air, turbulent flow proves more effective in transferring heat energy from the heat sink into the flowing air. Turbulent flow acts to scrub away the boundary layer or push away the stagnant layer of air that is closest to the heat sink, thereby enhancing the fluid convection coefficient increasing heat transfer. Turbulent flow also increases velocities and pressures on the surface to be cooled, increasing thermal transfer. The term "Turbulator" as referenced herein is a device that enhances disruption of a laminar flow into a more turbulent flow.

Although repeated reference may be made to a preferred embodiment, and although preferred embodiments may be described in the context of a horticulture lighting fixture configured to use a double ended high pressure sodium lamp, various embodiments are described that the inventor discovered apply to other types of lamps and especially high intensity lamps used for horticulture applications and those lamps that benefit from various aspects of the various embodiments. The various inventive aspects are separable and may apply to lighting fixtures generally, to lighting fixtures requiring cooling, to lighting fixtures with air cooling features and using lamps that have improved performance when the lamp is isolated from moving air used to cool the fixture, to lighting fixtures that use a single ended type high intensity horticulture lamp, or to other applications.

Figure 2:
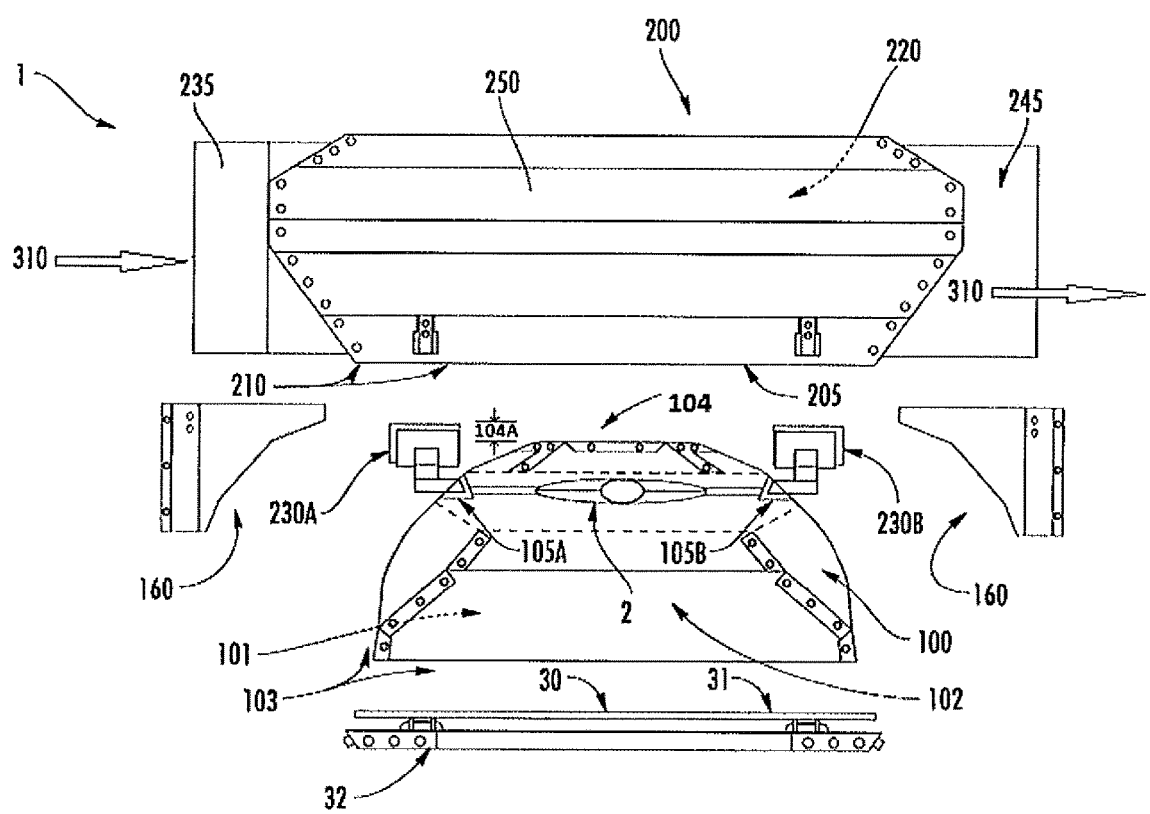
FIG. 2 is a cutaway exploded side view of the fixture in FIG. 1.

Referring now to FIG. 1-2, a preferred embodiment of the fixture comprises a reflector 100 captured within a housing 200 defining a cooling chamber 300 within the air space located between the reflector exterior side 102 and housing interior 220, the cooling chamber 300 being in air communication with a first duct and second duct. A cooling air stream 310 is disposed through the cooling chamber 300 between the first duct 235 and the second duct 245. Two lamp sockets 230A-B located partially through two opposing reflector apertures 105A-B provide the install location for the double ended HPS lamp within the reflector interior side 101. A flow disruptor 160 fixates over each socket 230A-B and aperture 105A-B diverting moving air from entering the reflector interior side 101 while further creating air eddies and local air turbulence within the cooling chamber 300 between the sockets over the reflector top 104 at the reflector's 100 hottest spot, substantially above the lamp 2. The flow disruptor 160 interference with the cooling air stream 310 creates air eddies, increases local vortex velocities within the cooling chamber 300, scrubs away boundary layers of air proximal to the reflector exterior side 102 that reduce heat transfer, thereby enhancing convective heat transfer from the reflector 100 into the cooling air stream 310.

With reference to FIG. 1 and FIG. 2, the fixture 1 includes a housing 200, a reflector 100 captured within the housing 200, a cooling chamber 300 defined by the air space between the housing 200 interior and the reflector exterior side 102. The cooling chamber 300 being in air communication with a first duct 235 and second duct 245, located substantially on opposite sides of the housing 200. Between the first duct 235 and the second duct 245 flows the cooling air stream 310 through the cooling chamber 300, the cooling air stream 310 which is pushed or pulled by remote fan not shown but commonly used in the prior art, connected by hose or ducting to the first duct 235.

Before flowing over the reflector top 104, the cooling air stream 310 is split or deflected by the flow disruptor 160 enhancing turbulent flow thereby increasing thermal transfer from the reflector interior side 101, through the reflector 100, convectively transferring from the reflector exterior side 102 into the cooling air stream 310. The hottest area of the reflector 100 is the reflector top 104 directly above the lamp 2, which is the closest structure to the light source. As captured within the housing 200, the reflector 100 has a reflector top air gap 104A defined between the reflector top 104 and the housing interior 220. The reflector top 104 air gap 104A for the preferred embodiment using a 1000 watt double ended HPS lamp is ⅜ of an inch, which provides ample cooling chamber 300 space for turbulent air movement as between the reflector top 104 and the housing interior 220 facilitating adequate cooling while maintaining an acceptably air insulated housing 200 exterior temperature.

By cutaway illustration with dashed lines in FIG. 2, the lamp 2 is shown installed by its ends into the sockets 230A-B within the reflector interior side 101 near the reflector top 104. The lamp 2 is shown oriented parallel to the cooling air stream 310, however, the robust design allows for the lamp 2 to be oriented within the reflector 100 at any diverging angle relative to the cooling air stream 310.

Figure 3:
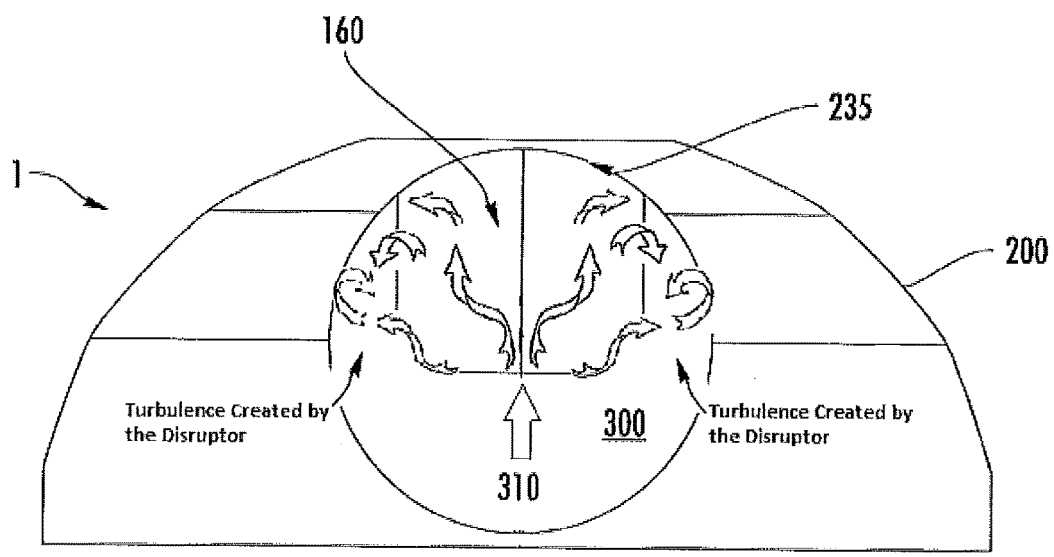
FIG. 3 is a diagrammatically section end view of the fixture in FIG. 1.
Figure 3:
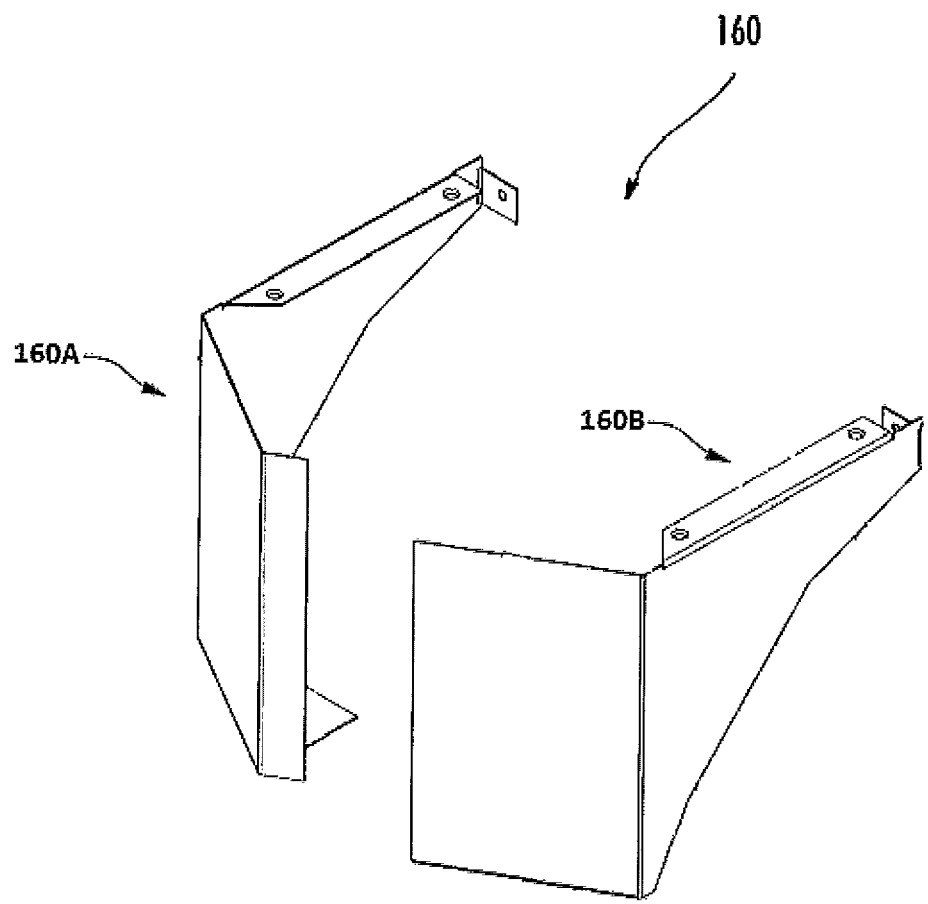
Figure 3:
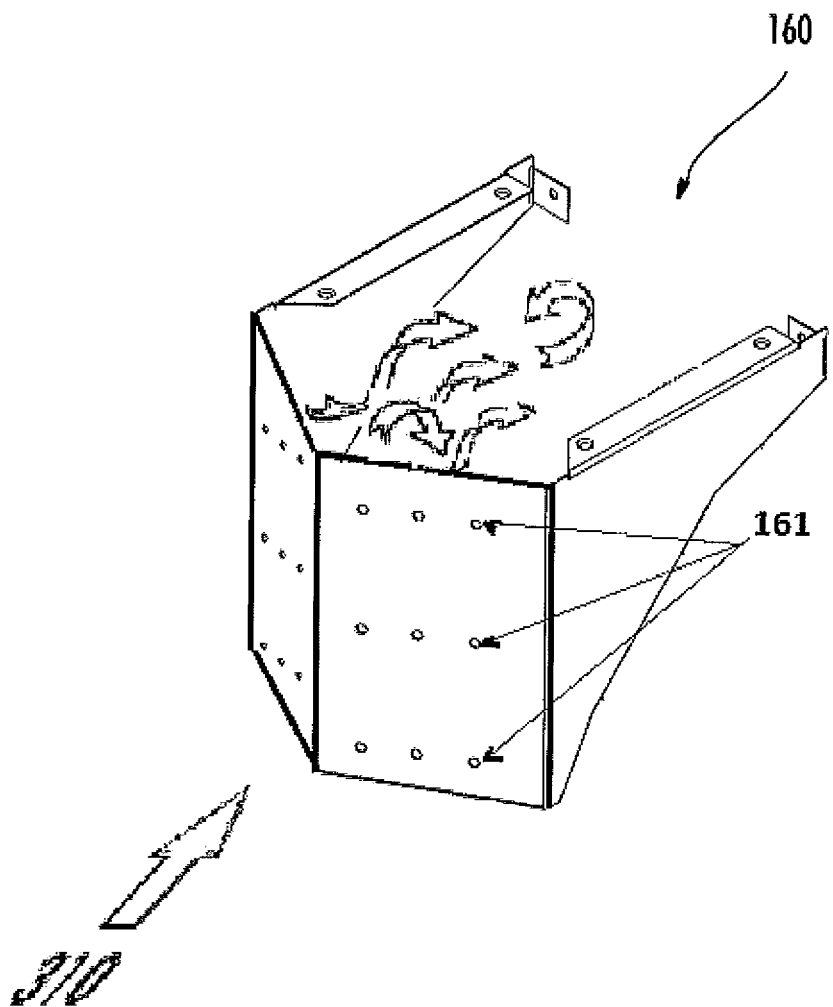

As shown diagrammatically by sectioned view in FIG. 3, cooling air directions being depicted by arrows illustrates the cooling air stream 310 as impacted by the flow disruptor 160. In operation, the cooling air stream 310 is being forced to move with a fan (not shown) either by fan push or fan pull through the first duct 235, then into and through the cooling chamber 300 to be exhausted out the second duct 245. The cooling air stream 310 is diverted and split by a flow disruptor 160 directing part of the air over one side of the reflector exterior 102, the other part over the other side of the reflector exterior 102. The diverted cooling air stream 310 is redirected within the fixture 1 such that moving air is discouraged from pressuring any apertures, gaps, or through holes in the reflector 100.

As depicted in FIG. 3 and shown in FIG. 3A, the flow disruptor 160 constructed to be deflecting and disrupting to moving air and arranged to attach over at least one socket 230 and enclose at least one aperture 105 such that cooling air moving through the cooling chamber 300 is diverted and disrupted into a more turbulent flow than a laminar flow regime. A preferred embodiment locates the flow disruptor 160 to encourage deflection of moving air away from the sockets 230 and aperture 105 as discussed above, essentially fulfilling two functions, creating turbulence within the cooling chamber 300 while also redirecting moving air away from reflector areas 100 that may be subject to leaks. The flow disruptor 160 location is not limited to enclosing the sockets 230 or apertures 105, as a flow disruptor 160 located within the first duct 235 or second annular duct 245, depending on which receives the incoming cooling air stream 310, is effective at introducing turbulence into the cooling air stream 310, and depending on which configuration may be preferred. Additional flow disruptors 160 working independently or in cooperation may be included within the cooling chamber 300 mounted to the reflector 100 or the housing 200.

The preferred embodiment design of the flow disruptor 160 shown in FIG. 3A is simply constructed from a first sheet metal portion 160A and a second sheet metal portion 160B, the preferred metal being steel over aluminum, as the thermal conductivity of the flow disruptor 160 is not as important as the costs associated with manufacture, but in practice both metals are suitable. As shown in FIG. 3A, the flow disruptor 160 is impervious to moving air to facilitate the dual function of deflecting moving air away from the reflector apertures 105 while also creating turbulence within the cooling chamber 300.

As shown in FIG. 3B, an enhanced flow disruptor 160 having turbulators 161 illustratively depicted as rows of through holes. The turbulators 161 could also be fins, blades, vents, or grating, most any disrupting structure, redirecting channel, or obstacle for the cooling air stream 310 will cause turbulence and thereby increase thermal conductivity from the reflector 100 into the cooling air stream 310.

As discussed above, the reflector 100 is a thermally conductive component of the fixture acting as a heat sink for the lamp 2. The reflector 100 preferably is constructed from aluminum, which is the favored material because of its relatively high thermal conductivity, easily shaped and formed, and highly reflective when polished. The high thermal conductivity of aluminum provides beneficial heat transfer between the reflector interior side 101 to the reflector exterior side 102 thermally transferring or heat sinking through the reflector 100. Steel is also a suitable material, however the lower thermal conductivity makes aluminum the preferred reflector 100 material.

As shown in the FIGS., openings, gaps, or spaces through the reflector 100 are preferably filled, blocked, or covered such that the reflector interior side 101 is substantially sealed from moving air. As assembled and captured within the housing 200, a first socket 230A is disposed to fill a reflector 100 first aperture 105A sealing the first aperture 105A from moving air. A second socket 230B is disposed to fill the second aperture 105B sealing the second aperture 105B against moving air. The first socket 230A and second socket 230B constructed and arranged to cooperatively receive the ends of the double ended HPS lamp 2 as located within the reflector interior side 101 between the two sockets 230A-B. As shown from the side in FIG. 2 and by depiction in FIG. 3, flow disruptors 160 attach over the sockets 230A-B and over both apertures 105A-B within the path of the cooling air stream 310. In this way, the flow disruptors 160 enclose any opening or space between either socket 230A-B and aperture 105A-B respectively, thereby diverting air moving through the cooling chamber 300 away from any potential opening into the reflector interior side 101. Filling of each aperture 105A-B by partial insert of each socket 230A-B requires precise manufacturing tolerances or specially formed sockets 230 in order to prevent or substantially stop moving air from traveling around the socket 230 into the reflector interior side 101. Heat resistant sealing mediums like metal tape or high temp calk are available to positively seal the aperture 105 to the socket 230 thereby diverting the cooling air path 310 from entering the reflector interior side 101. However, high temperature sealing mediums tend to be expensive, and application of the sealing medium as performed manually is often messy, slow, and leaves one more step in the manufacturing process subject to human error. As discussed herein, a preferred embodiment utilizes flow disruptors 160 constructed from sheet metal that are impervious to air rather than sealing mediums. However sealing mediums if properly applied will work in the place of a flow disruptor 160 for the limited purpose of sealing the reflector interior 101, but lack the aerodynamic structure necessary to disturb the cooling air stream 310 creating turbulence between the first socket 230A and second socket 230B for enhanced convective transfer of heat from the reflector 100 into the cooling air stream 310.

Figure 4:
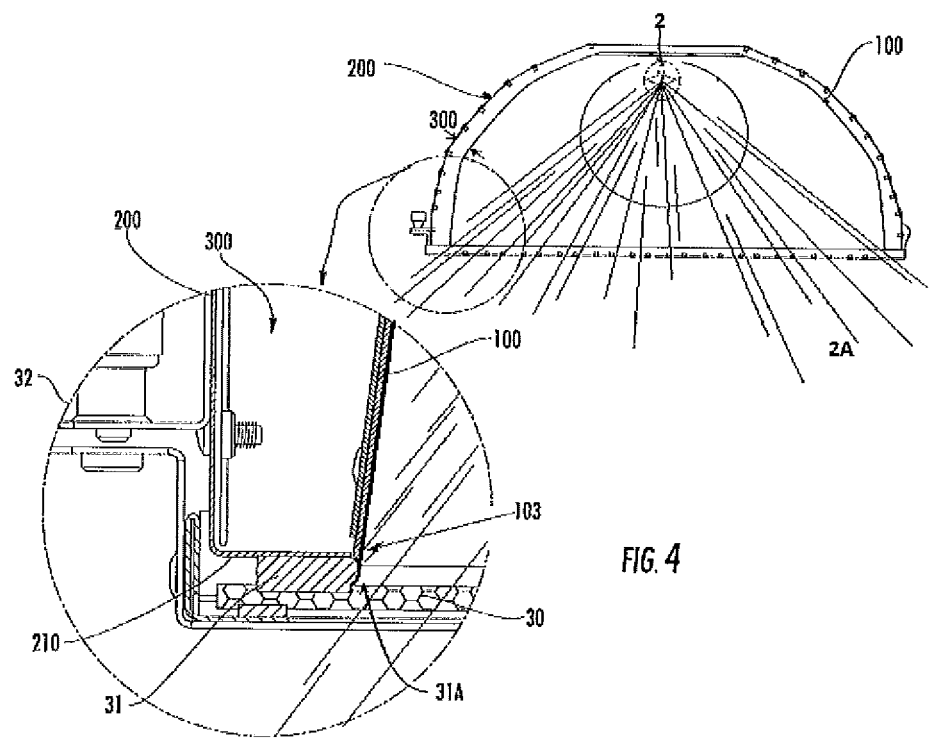
FIG. 4 is a cutaway corner of the fixture in FIG. 1 showing the compressively deformed shadowed gasket.

In FIG. 4 a sectional view with a close up of the bottom corner of the fixture 1 showing by illustration the cooling chamber 300 as defined between the reflector 100 and the housing 200. The cooling chamber 300 is shown in cross section demonstrating from top to bottom the relative size of air space between the reflector 100 and the housing 200 for the preferred embodiment. As shown, there is only one continuous cooling chamber 300, however several smaller cooling chambers 300 split by disruptors 160 or mounting fins between the housing interior 220 and the reflector 100 provide greater control of the movement of the cooling air stream 310 through the fixture 1.

The lower left close up view shown in FIG. 4 of the bottom corner of the fixture 1 demonstrates the lower lip 103 of the reflector 100 location as captured within the housing 200, wherein the lower lip 103 is adjacent to and slightly extending below the housing lower edge 210. As captured, the reflector's 100 lower lip 103 and housing lower edge 210 thermally transfer heat energy. This heat sinking occurring between the reflector's 100 hotter lower lip 103 and the housing 200 cooler lower edge 210 makes the lower lip 103 the coolest part of the reflector 100, making for the most suitable place to seal the reflector 100 using a gasket 31. A specially formed reflector lip 103 protectively shadows the gasket 31 from damaging light energy produced by the double ended HPS lamp 2 thereby preventing premature failure of the gasket 31 during operation. As compressed, the gasket seals against the housing edge surface slightly deforming 31A to further seal against the reflector lip 103. In this way, a double redundant seal is provided between the fixture interior and the growing environment, while also providing a positive air tight seal between the cooling chamber 300 and the reflector interior side 101 that is not as susceptible to premature seal failure.

As shown in FIG. 4, a compressive sealing between a glass sheet 30 and the housing edge 210 with a gasket 31 sandwiched in between thereby seals the growing environment from the fixture interior, in preferred embodiments. The gasket 31 being located relative to the reflector 100 such that the reflector lower lip 103 shadows or blocks direct light 2A produced by the lamp from impacting the gasket 31. As shown, the glass sheet 30 is preferably held in place compressively by at least one latch 32 with enough compressive force to deform the gasket 31. The deformed gasket 31A sealingly contacts the lower lip 103 making a second redundant seal against the coolest part of the reflector 100 at the lower lip 103 which is shadowed and protected from the direct light energy produced by the lamp 2. For a preferred embodiment the gasket 31 is constructed of a porous neoprene material, however many suitable heat resistant gasket materials may be used to construct the gasket 31.

In less preferred embodiments, the gasket 31 may be, as shown in FIG. 4, compressed between the lower lip 103 and the perimeter material shown retaining the glass 30 and fastenable to latch 32, but without the glass sheet 30 itself. That is, in less preferred embodiments the glass sheet 30 may be omitted with the structure shown in FIG. 4 still providing isolation between the reflector interior 101 and the cooling chamber 300. As shown, the housing 200 cooler lower edge 210 may be formed so as to maintain a substantially sealed lower edge 210 portion of the cooling chamber 300. The inventor discovered horticulture applications not requiring the thermal protective aspects (i.e. to protect plants growing under the fixture from burning) benefit from increase light projected from the lamp and reflector interior 101 when a glass sheet 30 is not used with the fixture. Without the glass sheet 30, the inventor discovered, an open (i.e. no glass) air cooled horticulture lighting fixture is provided that beneficially isolates cooling air flow from the lamp, which the inventor discovered in turn improves light performance from the fixture.

Figure 5:
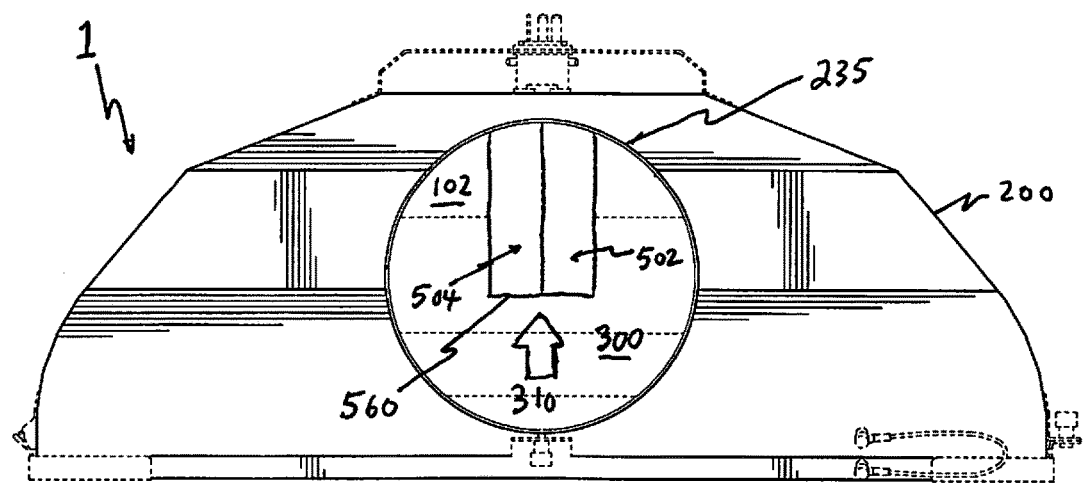
FIG. 5 is a front end view of a fixture having a different flow disruptor structure than shown in FIG. 3, according to preferred embodiments.

In some embodiments, the fixture 1 may comprise an air cooled horticulture lighting fixture having the cooling chamber 300 and other features previously described, except configured with a different flow disruptor 560 as shown in FIG. 5 which is a front end view of a fixture 1 having a different flow disruptor 560 structure than shown in FIG. 3. The cooling air stream 310, as shown, flows in through a first duct 235 and is diverted by a disruptor 560, with part of the moving air diverted to one side of the reflector exterior 102 by a first angled surface 502 and part of the moving air diverted to the other side of the reflector exterior 102 by a second angled surface 504. The diverted cooling air stream 310 is redirected within the fixture 1 such that moving air is discouraged from pressuring any apertures, gaps, or through holes in the reflector 100.

Figure 6:
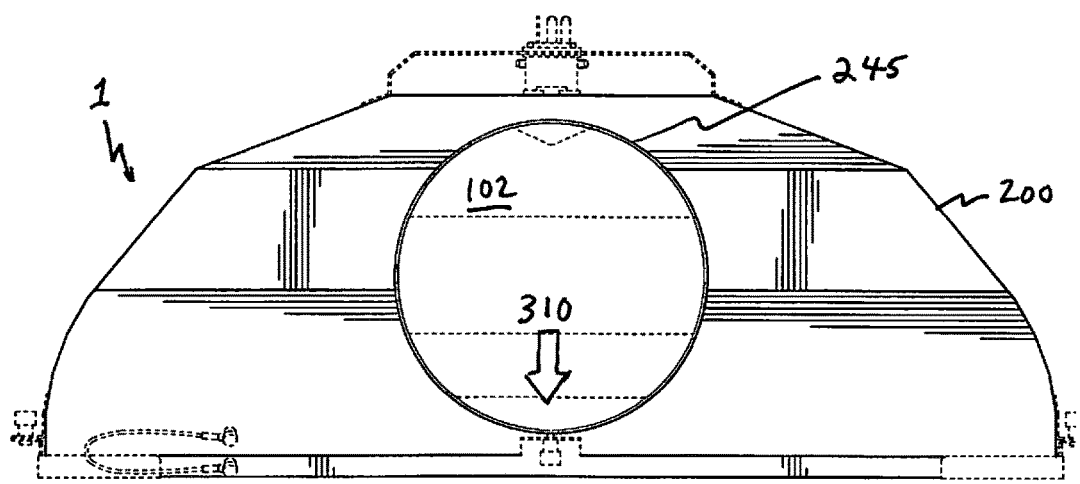
FIG. 6 is a rear end view of the fixture depicted in FIG. 5, according to preferred embodiments.

In some embodiments a disruptor such as the disruptor 560 is oriented in one or the other of the first duct 235 or the second duct 245, or both the first duct 235 and the second duct 245, as illustrated in FIG. 2. In one embodiment, as shown in FIGS. 5 and 6, a disrupter 560 is oriented in the first duct 235 but not the second duct 245. FIG. 6 is a rear end view of the fixture depicted in FIG. 5, according to preferred embodiments, with the cooling air stream 310 flowing over and around the reflector exterior 102 and out of the second duct 245.

Figure 7:
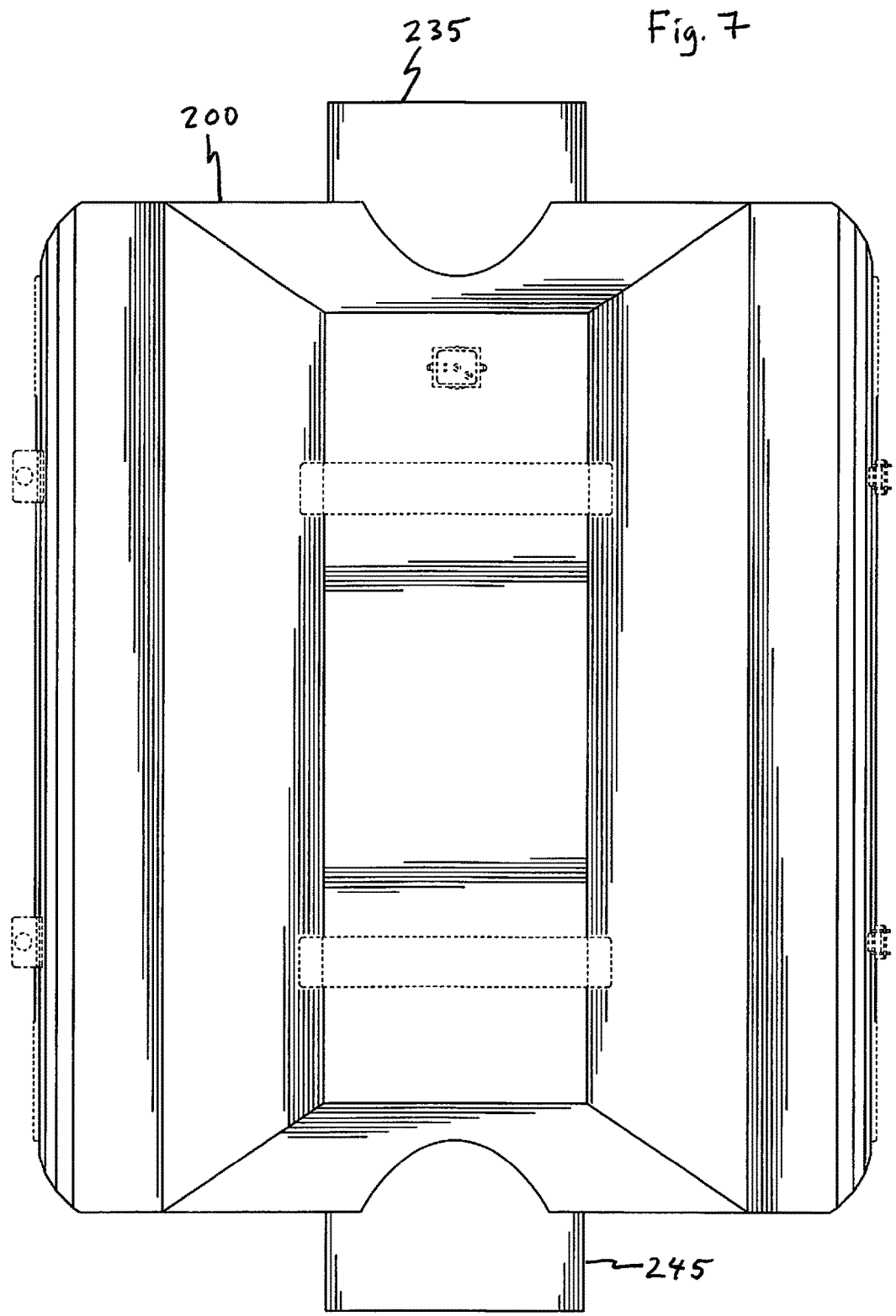
FIG. 7 is a top view of the fixture depicted in FIGS. 5 and 6, according to preferred embodiments.
Figure 8:
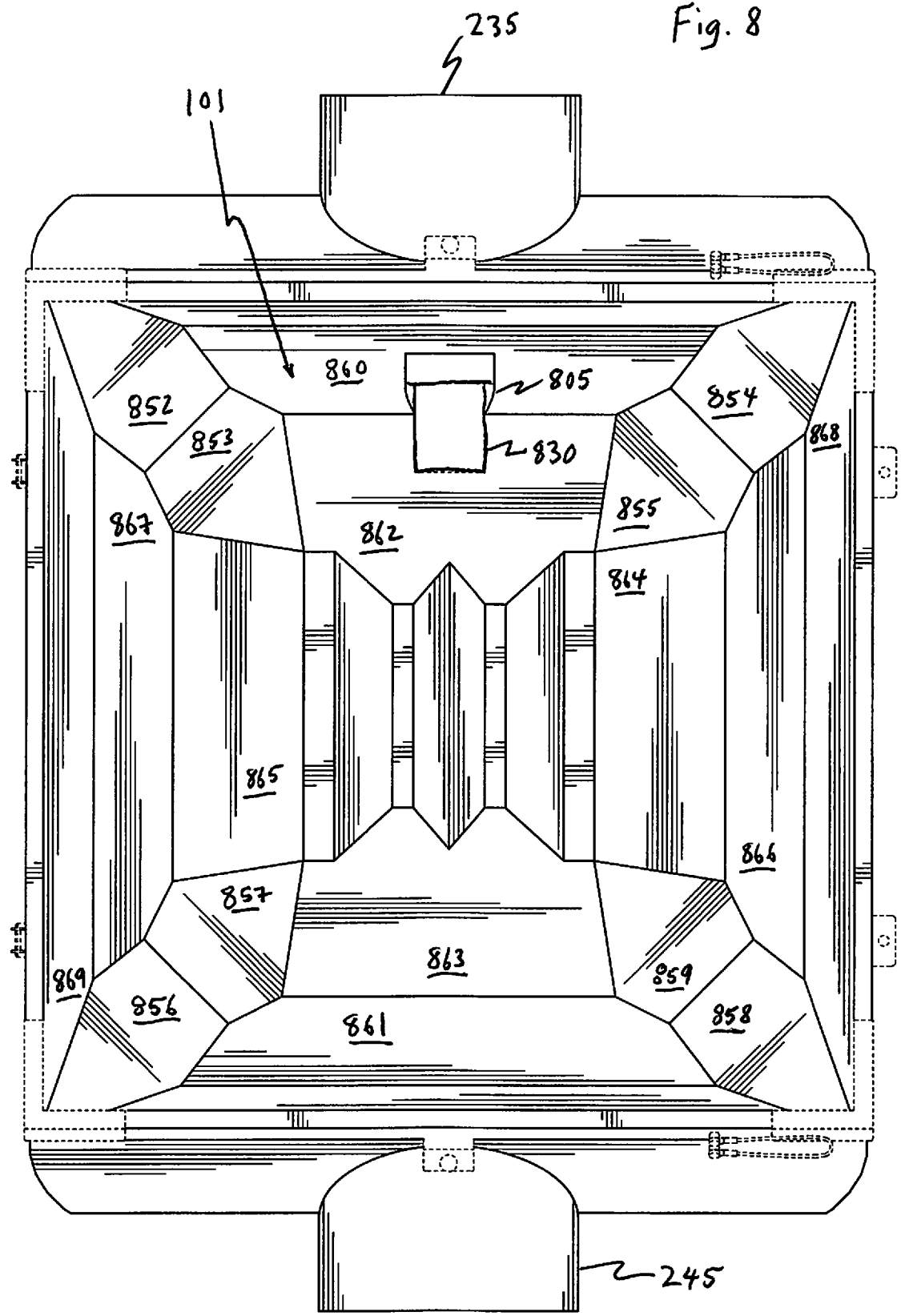
FIG. 8 is a bottom view of the fixture depicted in FIGS. 5-7, showing incorporation of a single ended lamp socket protruding from an aperture in the reflector interior surface, according to preferred embodiments.
Figure 9:
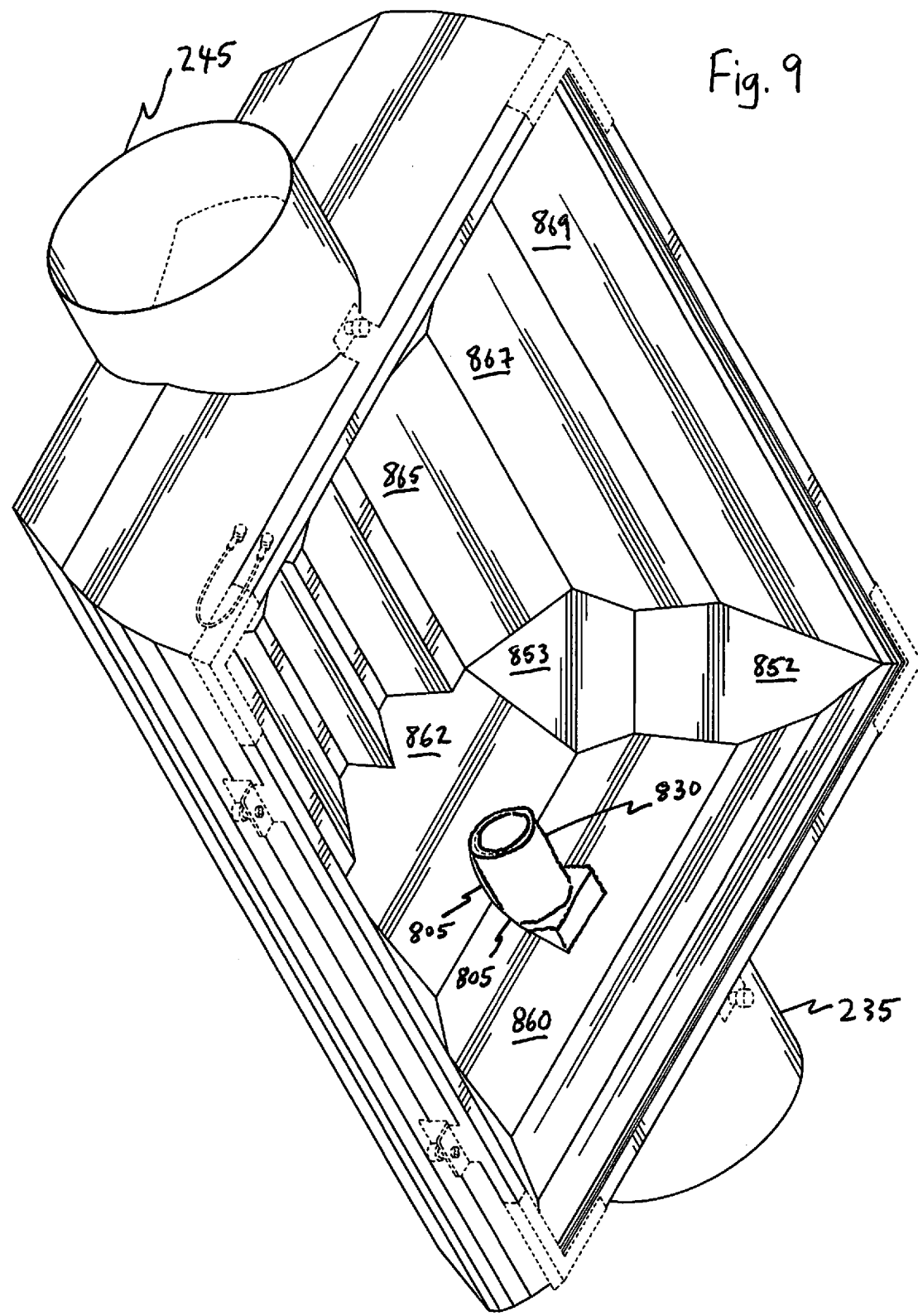
FIG. 9 is a perspective view of the fixture shown in FIGS. 5-8, as viewed from below, according to preferred embodiments.

FIG. 7 is a top view of the fixture depicted in FIGS. 5 and 6, according to preferred embodiments, and FIG. 8 is a bottom view of the fixture depicted in FIGS. 5-7, showing incorporation of a single ended lamp socket 830 protruding from an aperture 805 in the reflector interior surface 101, according to preferred embodiments. FIG. 9 is a perspective view of the fixture shown in FIGS. 5-8, as viewed from below, according to preferred embodiments.

The socket 830 preferably receives a single ended high pressure sodium horticulture lamp, orienting the (tube shaped) lamp (not shown) to extend from the socket 830 nearest the first duct 235 longitudinally in a direction toward the second duct 245. The lamp when fit into the socket 830 is preferably oriented substantially parallel to a longitudinal axis extending between the first duct 235 and the second duct 245. In preferred embodiments, the lamp when fit into the socket 830 is oriented substantially parallel to a plane formed by the lower edges 210 of the housing 200, or parallel to a plane formed by the lower lip 103 of the reflector 100, and on the reflector interior 101 side of the reflector 100, isolated from the cooling chamber 300.

Figure 10:
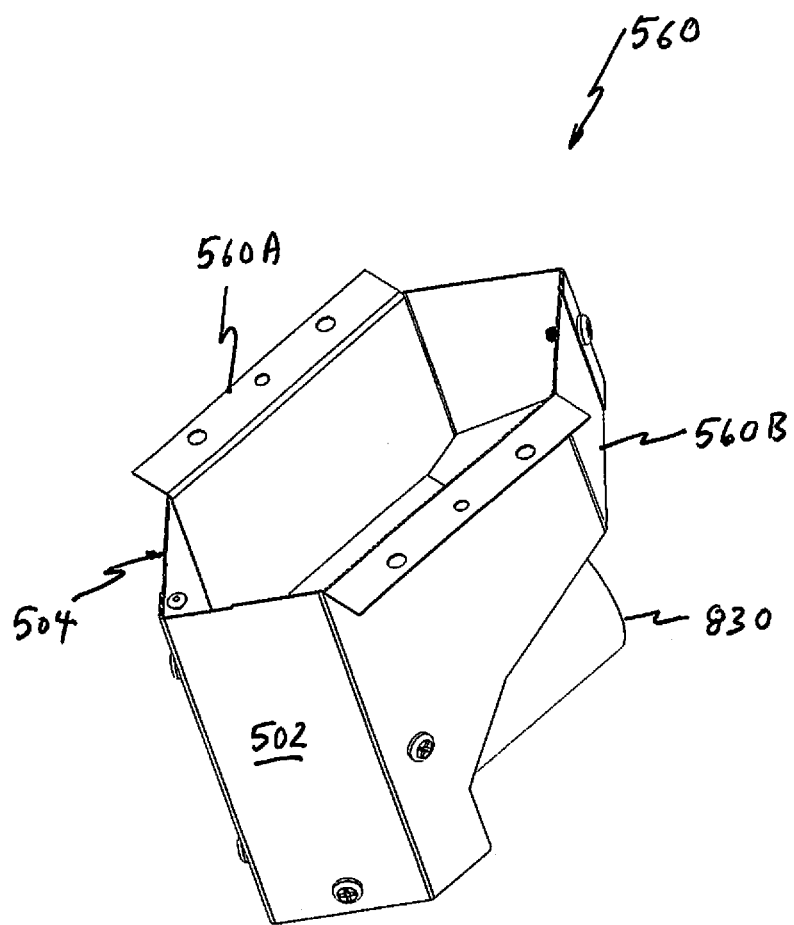
FIG. 10 is a perspective view of an air flow diverter or disruptor structure, according to various preferred embodiments.

In preferred embodiments, the portion of the socket 830 extending through the aperture 805 in the reflector 100 comprises structure that discourages air flow from pressuring the aperture 805, and preferably comprises structure in common with the disruptor 560. FIG. 10 is a perspective view of an air flow diverter or disruptor 560 structure, according to various preferred embodiments. Preferably the flow disruptor 560 shown in FIG. 10 is simply constructed from a first sheet metal portion 560A and a second sheet metal portion 560B. Also preferably, the disruptor 560 comprises diverter surfaces 502 and 504 on one end, with similarly angled diverter surfaces on the other end, so that air moving longitudinally in either direction to or from the first duct 235 or the second duct 245 is diverted around the aperture 805 in the reflector 100 and portions of the socket 830 extending into the reflector exterior side 102.

The various embodiments described herein may have cooling air pushed or pulled through the cooling chamber 300 by fan or other forced air apparatus, and in either direction. The robust fixture 1 cools effectively with either a negative pressure or positive pressure within the housing 200 due to the isolated reflector 100 interior side 101. Two fans used in cooperation may be implemented without diverging from the disclosed embodiment, and linking fixtures together along one cooling system is also feasible, similar to current 'daisy chaining' configurations.

Also illustrated in FIGS. 8 and 9 are surface regions of reflector interior 101, shown numbered consecutively from 852 to 869. Each surface region is preferably (as shown) a flat interior surface of the reflector interior 101. The inventor discovered that using different surface finishes for different regions affect the light intensity directed to particular target areas. Depending upon the particular type of lamp bulb used, choosing a mirror reflective finish, in one embodiment, for regions in the corners—shown numbered consecutively from 852 to 859—and a hammertone reflective surface finish in the side and end regions—shown numbered consecutively from 860 to 869—may soften hot spots in the light projected from the fixture 1 that would otherwise exist if a mirror reflective finish were used. In another embodiment, choosing the reverse—mirror finish in the side and end regions and hammertone finish in the corners—may achieve the softening of hot spots, depending upon the particular type of lamp bulb used, for example whether a double ended HPS bulb or a single ended HPS bulb is used in the horticulture lighting fixture 1 as shown and described in the FIGS. In similar fashion, the inventor discovered that any particular region—any one or more of the regions consecutively numbered from 852 to 869—may comprise a hammertone finish with the rest of the regions being a mirror reflective finish, to maximize the amount of light directed to the plant growing target and selectively soften hot spots that may be characteristic for particular types or manufacture of horticulture high intensity lamp bulbs.

The foregoing detailed description has been presented for purposes of illustration. To improve understanding while increasing clarity in disclosure, not all of the electrical power connection or mechanical components of the air cooled horticulture light fixture were included, and the invention is presented with components and elements most necessary to the understanding of the inventive apparatus. The intentionally omitted components or elements may assume any number of known forms from which one of normal skill in the art having knowledge of the information disclosed herein will readily realize. It is understood that certain forms of the invention have been illustrated and described, but the invention is not limited thereto excepting the limitations included in the following claims and allowable functional equivalents thereof.

What is claimed is:

1. An air cooled horticulture lamp fixture 1 for growing plants in confined indoor growing spaces, comprising:
a housing 200 having an open bottom 205 circumscribed by a housing edge 210, a first duct 235 and a second duct 245, and a housing interior 220;
a reflector 100 captured within the housing interior 220, the reflector 100 having an aperture 805 therein, a reflector interior side 101, a reflector exterior side 102, a reflector top 104, and an open bottom 106 circumscribed by a reflector lip 103, the reflector lip 103 located adjacent to the housing edge 210 defining at least one cooling chamber 300 in the space between the reflector exterior side 102 and the housing interior 220, the cooling chamber 300 being in air communication with the first duct 235 and the second duct 245;
a socket 830 disposed to fill said aperture and capable of electrically connecting an end of a lamp bulb 2 so that said lamp bulb 2 is oriented substantially parallel to a plane formed by said housing edge 210 as located within the reflector interior side 101;
a cooling air stream 310 disposed through the cooling chamber 300 between the first duct 235 and the second duct 245, the cooling chamber 300 constructed so that substantially no air flowable between the first duct 235 and the second duct 245 flows through the area proximate to the lamp bulb 2 or within the reflector interior side 101; and
a glass sheet 30 covering a plane formed by the reflector lip 103 to seal the reflector interior side 101 from the confined growing space.

2. The fixture of claim 1 wherein said socket is disposed to sealingly fill said aperture so that substantially no air flowable between the first duct 235 and the second duct 245 flows through said aperture.

3. An air cooled horticulture fixture for growing plants in confined indoor spaces according to claim 1, wherein the cooling air chamber 300 has a minimum air gap 104A over the lamp bulb 2 of at least ⅜ of an inch.

4. The fixture of claim 1 wherein said lamp bulb 2 comprises a single ended high pressure sodium (HPS) horticulture lamp.

5. A method of using a fixture as claimed in claim 1 comprising electrically powering said lamp bulb 2, maintaining elevated operating temperatures of said lamp bulb sealably enclosed between said reflector interior side 101 and said glass sheet 30, and cooling said fixture 1 by allowing heat generated by said lamp bulb 2 to be absorbed by air within said cooling chamber 300.

6. The method of claim 5 further comprising moving air between said first duct 235 and said second duct 245 to remove heat from said cooling chamber 300.

7. The method of claim 5 wherein said socket is disposed to sealingly fill said aperture so that substantially no air flowable between the first duct 235 and the second duct 245 flows through said aperture.

8. The method of claim 5 wherein the cooling air chamber 300 has a minimum air gap 104A over the double ended HPS lamp of at least ⅜ of an inch.

9. The method of claim 5 wherein said lamp bulb 2 comprises a single ended high pressure sodium (HPS) horticulture lamp.

10. The method of claim 5, said fixture further comprising a flow disruptor 560 disposed within the cooling air stream 310, the flow disruptor 560 being constructed and arranged to divert the cooling air stream 310 away from aperture 805 and to create local turbulence within the cooling chamber 300 thereby enhancing convective heat transfer from the reflector 100 into the cooling air stream 310.

11. The fixture of claim 1 further comprising a flow disruptor 560 disposed within the cooling air stream 310, the flow disruptor 560 being constructed and arranged to divert the cooling air stream 310 away from aperture 805 and to create local turbulence within the cooling chamber 300 thereby enhancing convective heat transfer from the reflector 100 into the cooling air stream 310.

12. An air cooled horticulture lamp fixture 1 for growing plants in confined indoor growing spaces, comprising:
a housing 200 having an open bottom 205 circumscribed by a housing edge 210, a first duct 235 and a second duct 245, and a housing interior 220;
a reflector 100 captured within the housing interior 220, the reflector 100 having an aperture 805 therein, a reflector interior side 101, a reflector exterior side 102, a reflector top 104, and an open bottom 106 circumscribed by a reflector lip 103, the reflector lip 103 located adjacent to the housing edge 210 defining at least one cooling chamber 300 in the space between the reflector exterior side 102 and the housing interior 220, the cooling chamber 300 being in air communication with the first duct 235 and the second duct 245, and the cooling chamber 300 being substantially isolated from the reflector interior side 101 so that air flowable between the first duct 235 and the second duct 245 is substantially prevented from flowing to or from the reflector interior side 101;

a socket 830 disposed to substantially fill said aperture and capable of electrically connecting an end of a lamp bulb 2 so that said lamp bulb 2 is oriented substantially parallel to a plane formed by said housing edge 210 as located within the reflector interior side 101; and a cooling air stream 310 disposed through the cooling chamber 300 between the first duct 235 and the second duct 245, the cooling chamber 300 constructed so that substantially no air flowable between the first duct 235 and the second duct 245 flows through the area proximate to the lamp bulb 2 or within the reflector interior side 101, said substantial isolation of the cooling chamber 300 from the reflector interior side 101 thereby substantially preventing air flowable between the first duct 235 and the second duct 245 from contacting and thereby cooling the lamp bulb 2.

13. The fixture of claim 12 further comprising a glass sheet 30 covering a plane formed by the reflector lip 103 to seal the reflector interior side 101 from the confined growing space.

* * * * *